United States Patent [19]
Kunz

[11] Patent Number: 4,687,561
[45] Date of Patent: Aug. 18, 1987

[54] PROCESS AND APPARATUS FOR TREATMENT OF FLUIDS, PARTICULARLY DEMINERALIZATION OF AQUEOUS SOLUTIONS

[76] Inventor: Gerhard Kunz, Ruhrstrasse 111, D-5628 Heiligenhaus, Fed. Rep. of Germany

[21] Appl. No.: 736,198

[22] Filed: May 20, 1985

Related U.S. Application Data

[63] Continuation of Ser. No. 573,940, Jan. 10, 1974, abandoned.

[30] Foreign Application Priority Data

| May 13, 1982 | [DE] | Fed. Rep. of Germany | 3217990 |
| Nov. 11, 1982 | [DE] | Fed. Rep. of Germany | 3241681 |
| Nov. 11, 1982 | [DE] | Fed. Rep. of Germany | 3241682 |

[51] Int. Cl.$^4$ .............................................. B01D 13/02
[52] U.S. Cl. .......................... 204/182.5; 204/182.3; 204/182.4; 204/301
[58] Field of Search ............... 204/573, 301, 182.5, 204/180 P, 180 B

[56] References Cited

U.S. PATENT DOCUMENTS

| 3,075,908 | 1/1963 | Kollsman | 204/180 P |
| 3,496,081 | 2/1970 | Scheder | 204/180 P |
| 3,645,884 | 2/1972 | Gilliland | 204/301 |
| 3,677,923 | 7/1972 | Bier | 204/301 |
| 3,704,218 | 11/1972 | Kato et al. | 204/301 |
| 3,869,376 | 3/1975 | Tejeda | 204/301 |
| 4,141,825 | 2/1979 | Conger | 204/182.5 |
| 4,148,708 | 4/1979 | Grant | 204/301 |
| 4,160,713 | 7/1979 | Matzuzaki et al. | 204/301 |
| 4,295,950 | 10/1981 | Cole | 204/301 |
| 4,465,573 | 8/1984 | O'Hare | 204/180 P |

FOREIGN PATENT DOCUMENTS

| 0212364 | 8/1957 | Australia . |
| 53-128584 | 11/1978 | Japan . |
| 0548355 | 4/1979 | Japan . |
| WO82/03994 | 11/1982 | PCT Int'l Appl. . |
| 0501431 | 2/1971 | Switzerland . |
| 1067567 | 5/1967 | United Kingdom . |

*Primary Examiner*—Arthur P. Demers
*Attorney, Agent, or Firm*—Fleit, Jacobson, Cohn & Price

[57] ABSTRACT

Process and apparatus are provided for demineralizing aqueous solutions without using regenerating chemicals. Oppositely charged ions are electrolytically generated within electrode chambers and diffused into the stream of aqueous solution to be demineralized flowing in cross-current thereto. In their migration in response to the application of an electric potential, the ion streams are subjected to displacement steps in cation and anion exchange masses separated by selectively permeable ion exchange membranes. The aqueous solution alternately passes through the cation and anion exchange masses resulting in a demineralized aqueous stream and an enriched brine stream.

39 Claims, 9 Drawing Figures

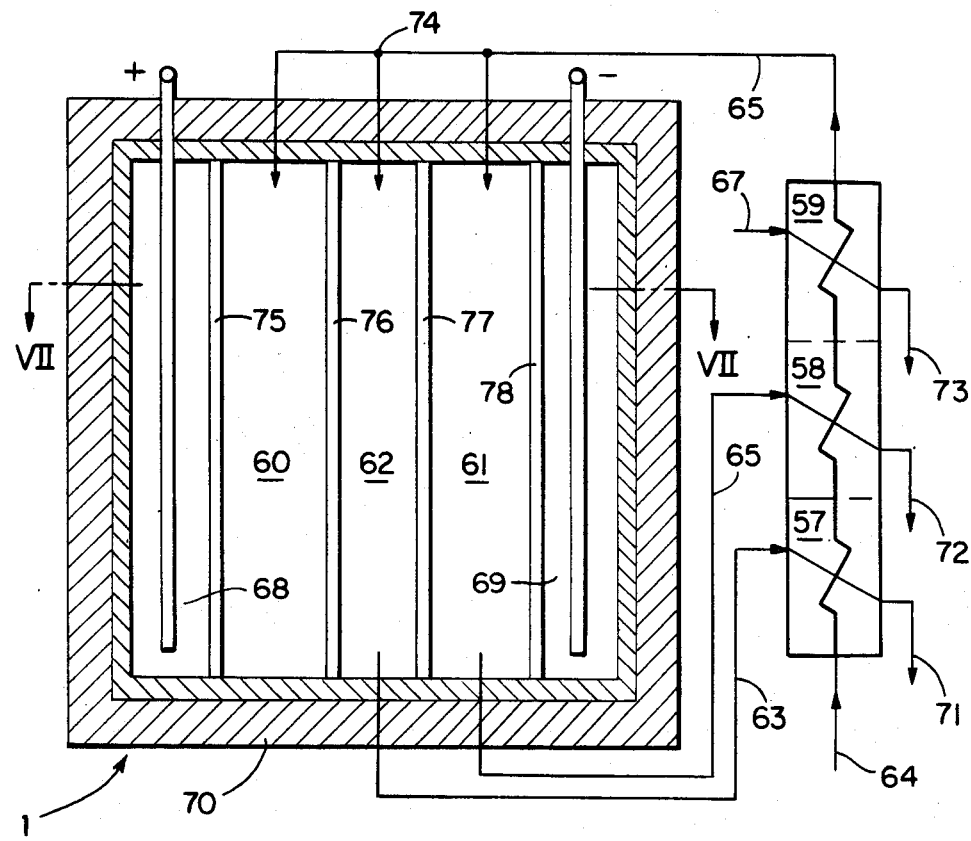
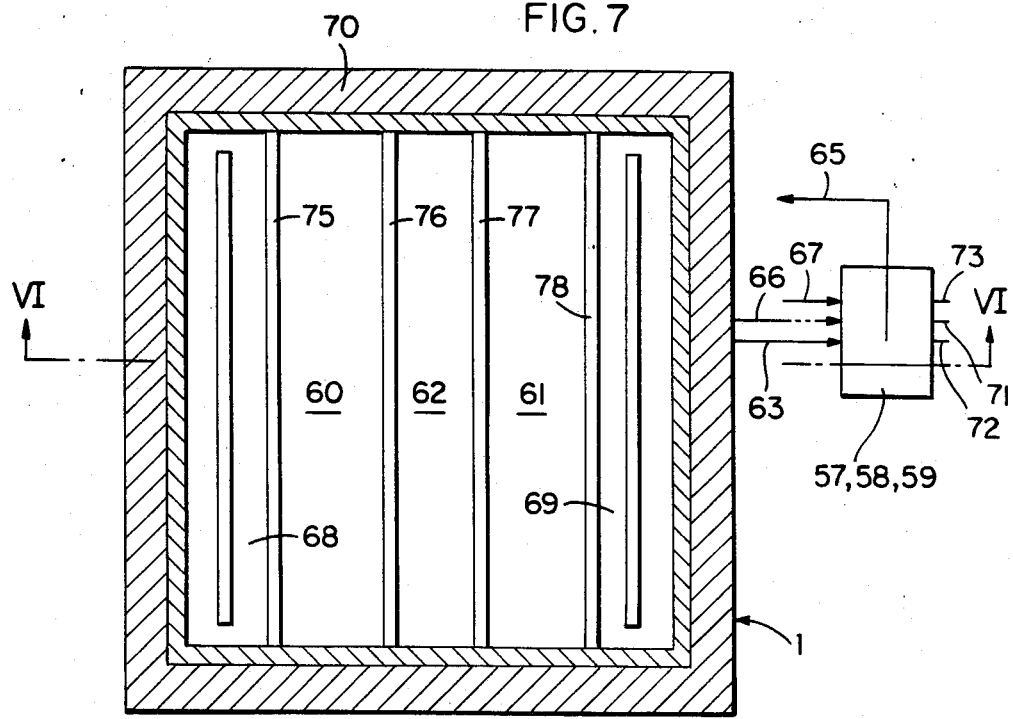

PROCESS AND APPARATUS FOR TREATMENT OF FLUIDS, PARTICULARLY DEMINERALIZATION OF AQUEOUS SOLUTIONS

RELATED APPLICATION

This is a continuation of my co-pending application, Ser. No. 573,940, filed Jan. 10, 1974, now abandoned.

FIELD OF THE INVENTION

The invention relates to a process and an apparatus for treatment of liquids, particularly for demineralizing aqueous solutions wherein the liquid is subjected to different successive absorption steps, and after passing through these steps, it is obtained as a treated product.

DESCRIPTION OF THE BACKGROUND

It is generally known that liquids, particularly aqueous solutions, such as water for various industrial uses, must be practically free of salts or its ionic dissociation components.

To serve this purpose, various processes have been used for the treatment of such liquids whereby such dissolved salts are removed.

Treatments having long been known for the removal of salts dissolved in water by absorbing the ions onto suitable substances, e.g., ion-exchange masses. However, this method has the considerable disadvantage in that the exchange masses get depleted over and over again and must be regenerated with dangerous chemicals such as acid or caustic solutions. Furthermore, considerably higher amounts of these chemicals must be used when compared with the amount of eliminated salt. Such dangerous chemicals are then flushed out with the waste water and constitute an environmental strain no longer acceptable to today's society, e.g., destruction of the biosphere in surface waters and the like.

It has also been known that ion-exchange masses can be regenerated with the aid of electric energy. Up until now, the practical use of this method was hindered by the fact that the energy requirement for producing sufficient capacity to separate the salt ions is relatively high, and that the apparatuses employed are much too expensive and do not always conform to the technical and industrial requirements.

Also known is a process called "electrodialysis". In this process, the ion-permeating or ion-blocking effects of ion-exchange membranes are used in such way that the ions of the liquid (or aqueous solution) to be demineralized migrate apart in an electric field through the membranes. This results in areas of salt enrichment and salt reduction by appropriately arranging the membranes. Considerable drawbacks have been noted both in the process and the apparatus employed for electrodialysis. As the water is demineralized its salt content decreases during the process. However, the electrical resistance rises in such way that an economical operation attaining high degrees of demineralization cannot be achieved with such known process. Thus, in order to attain an application at least in the area of low product grades, the membranes have been arranged at extremely small distances of not much more than 1 mm from each other. Through this close arrangement of the membranes the electric resistance, and with it also the consumption of energy, can be diminished; however, in practice, equipment costs for supplying and removing the liquid streams of product and brine rise considerably, and the susceptibility to fouling within the narrow passages between the membranes comprises the safe operation of the device.

DESCRIPTION OF THE INVENTION

Here the invention begins, with its function of demineralizing aqueous solutions in the absence of regenerating chemicals while at the same time achieving a high degree of demineralization and keeping the consumption of energy low. The device for the practice of the process is designed in a manner which is not susceptible to fouling and is practicable and reliable in practice within a wide range of throughput. Accordingly, the device provided herein maintains the quality and output of the product over a long period of time.

According to this invention this function is attained by process engineering in a manner such that:

different ions are produced in electrode zones separated from the absorption zones;

these ions are diffused into a crosscurrent of liquid passing through each absorption zone;

an electric field, particularly in the form of an electric potential, is applied to diffuse the moving ionic streams through the absorption zones;

these ionic streams on their way to the respective absorption zones and the ion-exchange masses which are placed therein pass one boundary layer each separating an absorption zone from an electrode zone;

these ionic streams cause an ion displacement in the ion-exchange masses in a way that they convey the ions found in each absorption zone out of the liquid phase and the ion-exchange phase and in contact with a crosscurrent of the liquid stream; the displaced ions each moving towards another boundary layer, one boundary layer separating the cation absorption zone and the other boundary layer separating the anion absorption zone;

these boundary layers separate a common brine (flushing) zone from the adjacent absorption cation-exchange phase and an absorption anion-exchange phase;

the ions migrating from the liquid phase and the ion-exchange phase penetrate the respective boundary layers which separate the brine (flushing) zone from the absorption zones. These ions are retained in the brine zone by the respective screening (blocking) boundary layer which repells the differently-charged ions; and these ions originating from the liquid being treated and now found in the brine (flushing) zone are flushed out of the brine zone in the form of a brine (flushing solution).

To practice the process according to the invention, a device is used which consists of at least one vessel with reaction chambers arranged therein for the liquid being treated in the chambers. These chambers are equipped with pipes for the supply and discharge of the liquid as well as a reaction chamber for the removal of the brine (flushing solution) from this device. According to the invention this device is characterized in a way such that:

the reaction chambers for the liquid being treated are provided as chambers bounded by ion-exchange membranes as boundary layers and these chambers are each filled with an ion-exchange mass;

each ion-exchange membrane is permeable to certain ions but impermeable to oppositely-charged ions and to the liquid;

included in these reaction chambers are electrode chambers with electrodes inserted therein. One electrode chamber is for the anode assigned to the reaction chamber filled with a cation-exchange mass, and a further electrode chamber is for the cathode assigned to the reaction chamber filled with an anion-exchange mass;

these chambers are separated from each other by ion-exchange membranes provided as barrier layers which are only permeable to ions. The ion-exchange membranes separating the reaction chamber of the cation-exchange mass are cation-permeable membranes, and the ion-exchange membranes separating the reaction chamber of the anion-exchange mass are anion-permeable membranes;

between at least one reaction chamber filled with a cation-exchange mass and one reaction chamber filled with an anion-exchange mass, a brine (flushing) chamber is formed which is separated from the reaction chambers by ion-exchange membranes.

By this arrangement of selective absorption, with the ion streams overlaying the reaction chambers in a diagonal stream and migrating in the electrical field originating from the electrodes, migration of the salt ions of the liquid to be treated is diagonally (tangentially) directed out of the liquid and into the brine (flushing) chamber. Thus, the process and apparatus of this invention presents a number of energy saving advantages in terms of process engineering and the design of the apparatus. In particular, these advantages are as follows.

(a) The ion streams moving from the electrodes in the electrode chambers into the liquid being treated cause a high conductivity in the solution even if its salt content has sunk to extremely low figures, i.e., the degree of demineralization has become very high. This feature avoids the disadvantage of an increase in resistance accompanying low salt content known to occur in electrodialysis processes. The electric potential, and with it also the consumption of energy, remain economical and even the quality of the product is very good (high degree of demineralization).

(b) By keeping the electric resistance low through the supply of the ion streams into the liqued, the cost of equipment for the solution being demineralized as well as the expenditures for the removal of the brine (flushing solution) can be substantially reduced. The spaces between membranes can be kept considerably larger (wider) than with the known electrodialysis apparatuses. Thus, the space between membranes can be very wide, thereby completely avoiding the susceptibility to blocking (plugging) the passageways within the reaction chambers as is very often the case with narrow passages. Furthermore, the costly installation of extras (additional equipment) to redirect the flow and the spacing of the membranes, as is generally known, can be omitted.

(c) Since during the process of demineralization the ion-exchange masses are in a dynamic equilibrium with their ion concentrations, they require neither a large ion-exchange capacity nor regeneration. This is a considerable advantage in two respects. On one hand, the chemicals for regeneration are unnecessary. This results in a decrease of the amount of minerals being discharged and in a lower environmental strain and a better quality of life for our society. On the other hand, larger quantities of ion-exchange masses, which have always been necessary with previous processes, be it in the regenerated or exhausted state, and which are not yet or no longer involved in the real demineralization process, can be omitted. The lower quantities of ion-exchange masses required by my invention also result in a considerable reduction in the cost of the apparatus itself and in the storage of these masses and the handling thereof. In addition, the apparatus can be made smaller and stored more easily.

(d) There is a direct correlation between product quality and energy consumption because of the dynamic equilibrium of the ion concentrations. This offers the possibility of adapting any quality requirement within a broad range thereof without an undue increase of energy. It is of importance that the throughput can be varied within a broad range with constant or varying product quality and that it can also be adapted to specific requirements without a loss of efficiency.

(e) A further advantage of the invention is that no wash water whatsoever is required. Thus, the overall efficiency of the raw water input is very high and water losses can be avoided. Additionally, this means that the brine concentration is considerably higher in comparison to other known demineralizing processes, e.g., reverse osmosis or total conventional demineralization with ion-exchange masses. This results in a twofold advantage:

(I) the load of waste water on the sewerage and the consumption of scarce raw water which are becoming a major problem are herein reduced; and (II) there are special applications in which, not the demineralized solution but, the brine is the desired product. An example of these applications is the recovery of metals from inorganic waste waters of valuable substances or even toxic substances (e.g., mercury). In these cases, a concentration of brine as high as possible is very much desired because, as a consequence thereof, the successive steps of electrolytic separations or chemical precipitations become more economical.

(f) A very major advantage of the process of my invention is that the resultant brine obtained is neutral in comparison, for example, to the chemical regeneration processes for complete demineralization. Therefore, neither devices nor chemicals are required for neutralization. Since additional apparatuses are not required, the present process results is lower operational costs and higher mineral dilution of the discharged water.

Further advantageous developments afforded by this invention are that:

(a) the process for treating the liquid can be carried out at a higher reaction temperature, (b) the electric energy transformed into heat energy is used in such way that the heat caused directly by the process of demineralization can be kept in the demineralization chambers by means of insulation against conductance and radiation, and (c) the capacitive heat of the liquid streams leaving the demineralization can be transferred to the liquid streams flowing again into the zone of demineralization and that heat required in excess of the temperature of demineralization can be further increased by adding external heat energy to the demineralization process.

Through these steps, i.e., demineralization by absorption in an electric field, the problems addressed by the invention are not only solved advantageously, but also a number of other economical advantages in process engineering are obtained. These advantages are in particular as follows.

(a) The higher temperature during the treatment of the liquid (i.e., during the process of demineralization in an electric field) causes an intensified ion movement and ion mobility in the liquid being demineralized, and thus a lower resistance for ion transport by absorption and diffusion. This permits a considerably lower driving electric potential. Since the energy expended for the elimination of ions by demineralization corresponds to the product of amperage and voltage, the energy consumption is consequently lowered considerably. Measurements have shown that the savings of electric energy are up to 50% when the temperature is increased by 30° C.

(b) The decrease of electric potential attained by the present invention permits a more favorable lay-out of the device's equipment for the electric supply of energy, which means a reduction in the capital cost of the equipment.

(c) The higher ion mobility caused by the higher temperature results in faster kinetic processes during demineralization, so that the demineralization apparatus can be smaller while preserving the same capacity. Consequently, a reduction in capital cost is attained.

(d) Certain salts, such as silicate compounds, present in the aqueous solution being demineralized are more rapidly displaced from the respective reaction chamber during demineralization at the higher temperatures used in the present invention than at a lower temperature. This results in a major improvement of demineralization quality despite the lower expenditure of electric energy.

(e) The recycling of the capacitive heat contained in the discharged liquid streams back into the demineralization chamber, and the insulation of the demineralization chamber against losses of heat by conductance and radiation result in an increase of temperature in the demineralization chamber without additional energy.

(f) If a process of demineralization is conducted at low demineralization capacity, the heat recovery and the heat insulation of the demineralization process are not sufficient to obtain a favorable higher range of temperatures. According to the invention, the dosing of extraneous heat into the process of demineralization causes a more economic, higher range of temperatures.

Lower operating costs are achieved in such a way that a more favorable range of temperatures is achieved for the demineralization process with low-cost heat and a low temperature level, e.g., waste heat, and therefore high-cost electrical energy is saved.

A further added feature contemplated by the present invention is that the cations displaced from the cation zone (e.g., calcium ions) can be supplied to anions (e.g., chloride ions), which form readily soluble compounds with the cations of the demineralization process, and that anions displaced from the anion zone (e.g., carbonate ions), can be supplied to cations (e.g., sodium ions), which form readily soluble compounds with the anions of the demineralization process. The cations and anions are supplied in the form of a saline brine or salt suspension (e.g., sodium chloride), and are separated by boundary layers from the cations displaced from the cation zone and from the anions displaced from the anion zone. The dissociated cations and anions of this saline brine (flushing solution) migrate away from each other in the electric field applied during the demineralization process in such a way that the anions from the demineralization in the brine chamber on the cation side, and the cations from the demineralization on the anion side are each led through the respective boundary layers, whereas the respective oppositely-charged ions cannot pass the respective boundary layers. The brine on the cation side and the brine on the anion side are each separately discharged from the demineralization apparatus.

By the foregoing technique, the problem addressed by the invention is not only solved advantageously, but in addition, a number of economic advantages in process engineering are also achieved. This is due to the feeding of readily soluble salt components into the process of concentration and demineralization in an electric field and to the formation of readily soluble compounds. These advantages are in particular as follows.

(a) The feeding of readily soluble salt-forming components prevents the precipitation of sparingly soluble substances during the increase of brine concentration. Simultaneously, this prevents an increase of the ohmic resistance to the passage of the ion streams. This results in a lower voltage difference requirement for the transport of ions (for the respective ion displacement). This, in turn, will result in a correspondingly lower energy consumption for demineralization.

(b) The decreased electric potential needed in the present invention permits a more economical lay-out of the device for the electric supply, and thereby a decrease in the capital costs required.

(c) By employing this added feature, the process of demineralization of the present invention becomes independent of the composition of the solution to be demineralized, and expensive measures for pretreatement of the solution to be demineralized can be avoided. Hence, the operation of the demineralization device becomes safer, less susceptible to breakdown and more economical with respect to investment as well as operation.

(d) By employing the practice of precipitation and crystallization in an appropriately designed mixing vessel placed outside of the demineralization device permits the separation of sparingly soluble substances produced by the demineralization process, and the recovery and reuse of the resulting brine (flushing solution) for the formation anew of readily soluble compounds.

(e) The recirculation of the brine (flushing solution) and the ion components dissociated therefrom, according to the invention, prevents an increase in salt concentration in the waste waters, and, thus, it also prevents an increase in the salt content in the drainage system, a well known problem with other processes of pretreatment.

(f) In certain applications, the desired product is not the demineralized aqueous solution but the concentrated brine. A considerably higher salt concentration in the brine (flushing) solution can be attained by feeding readily soluble ion components according to the invention. This, in turn, renders most subsequent processes for the treatment of the brine essentially less costly (e.g., successive electrolytic separating operations by decreasing the bath's volume and/or successive precipitation reactions because of the decreased reaction volume and concentration).

Further advantageous developments resulting from the invention are specifically described hereinbelow.

Some examples of the design of the invention are schematically illustrated in the drawings without restricting the invention thereto.

BRIEF DESCRIPTION OF THE DRAWINGS

FIG. 6 shows a cross-section through section plane VI—VI of FIG. 7 of a device for the treatment of liquids and three of the heat exchangers assigned to this device.

FIG. 7 shows a top view of the device and the heat exchangers whereby the device, because of the representation of its absorption chamber, is shown as a section of the sectional plane VII—VII of FIG. 6.

Figure 1:
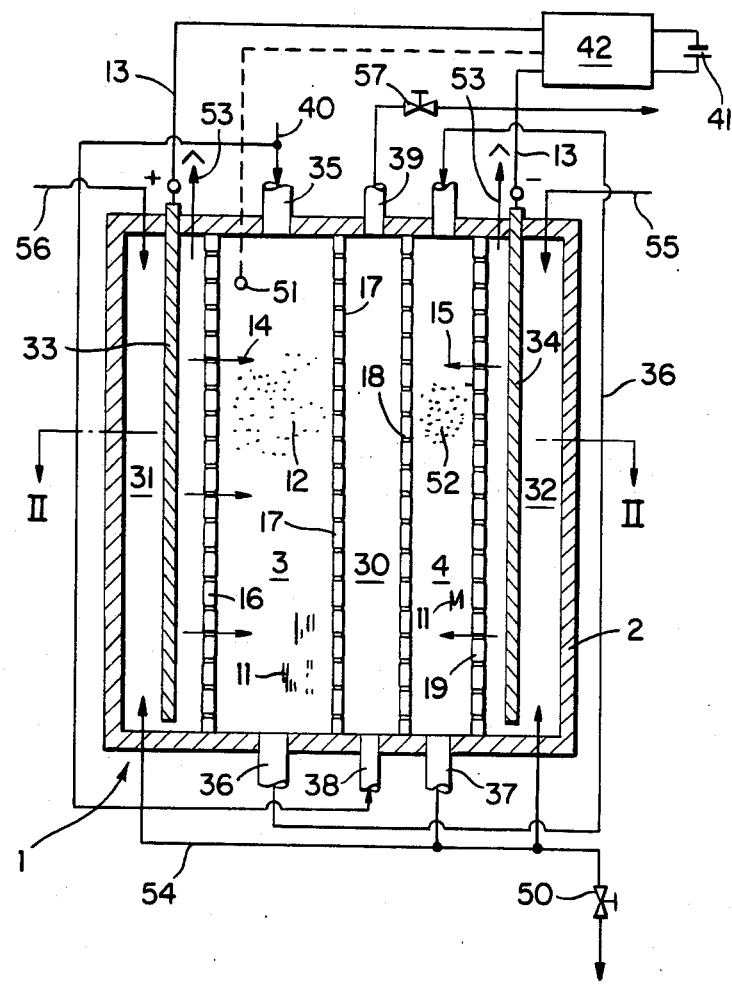
FIG. 1 shows a longitudinal mid-section through plane I—I of FIG. 2 of a device according to the present invention in which two reaction chambers arranged in one vessel and one brine chamber provided therebetween.

The device 1 according to the invention is built in accordance with the presentation in FIGS. 1, 2, 3 and 4 and is composed by a vessel 2 for reaction chambers 3 to 10 arranged therewithin, wherein the absorption processes taking place in the reaction chambers between a liquid 11 being treated, ion-exchange masses 12, 52 and ion streams 14, 15 coming from the electrodes 13, is in progress. Of the reaction chambers 3 to 10, at least one reaction chamber 3 is provided in vessel 2 for the flow of the cations 14 and a further reaction chamber 4 is provided for the flow of the anions 15. The reaction chambers 3 and 4 are each filled with ion-exchange masses 12, 52, and the ion streams 14 and 15 pass alternatingly and successively through chambers 3 to 10 containing the liquid 11 being treated.

Figure 2:
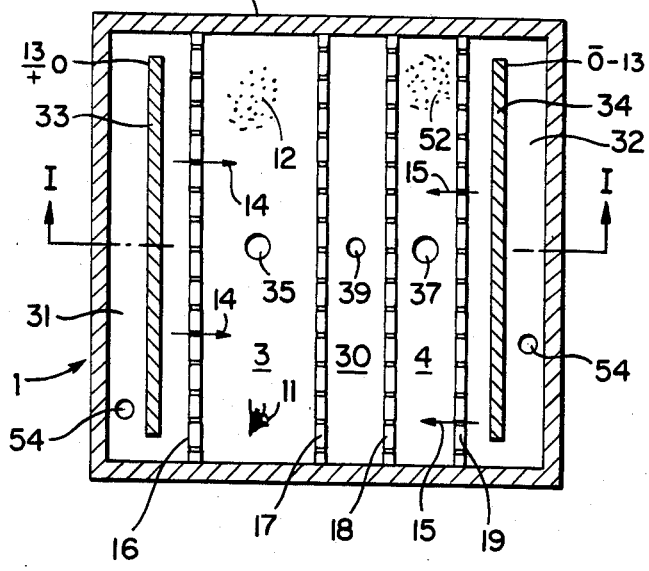
FIG. 2 shows a cross-section through plane II—II of FIG. 1 of the device.

The reaction chambers 3 and 4 of FIGS. 1 and 2 are bordered at the sides by boundary layers in the form of ion exchange membranes 16 to 19. These chambers are in an arrangement of one reaction chamber each (e.g., 3, for cations 14 and 4 for anions 15, in such reaction chambers) with a joint brine chamber 30 therebetween. Respective electrode chambers 31, 32 are arranged such that the reaction chamber 3 for the cations 14 borders the electrode chamber 31 of the anode 33, and the reaction chamber 4 of the anions 15 borders the electrode chamber 32 of the cathode 34.

The ion exchange membranes 16 to 19 between chambers 3, 4 and 31, 32 are designed in such way that they each permit the passage of ion streams 14, 15 into the respective reaction chambers 3, 4 and from each reaction chamber into the brine chamber 30. However, the membranes block the passage of liquid 11 as well as the passage of ions of opposite charge.

The term respective ion streams 14, 15 refers, for the reaction chamber 3, to the cations 14 produced by the anode 33 in the anode chamber 31 and, for the reaction chamber 4, to the anions 15 (the hydroxyl ions) produced by the cathode 34 in the cathode chamber 32.

The device 1 is conceived in such a way that a supply pipe 35 for the liquid 11 being treated is connected to the reaction chamber 3 containing the cations 14 (e.g., connected at the top). This chamber 3 is connected at the bottom by means of a discharge pipe.36 to the reaction chamber 4 for anions; said connecting pipe 36 extending to the top of chamber 4.

At the bottom of the reaction chamber 4 for the anions 15, is connected a so-called product pipe 37, through which the treated liquid 11 can flow out. The brine chamber 30 is separated by ion-exchange membranes 17, 18 on one side from the reaction chamber 3 for cations 14, and on the other side from the reaction chamber 4 for anions 15. This brine chamber 30 is equipped with a discharge pipe 39 and a supply pipe 38. The supply pipe 38 is connected through a connecting piece 40 to the supply pipe 35 to transfer a side stream of the liquid to be treated (as a transport liquid) into said brine chamber. The discharge pipe 39 is connected to a brine discharge not shown in the drawing. The electrodes 33, 34 entering the electrode chambers 31, 32 are connected to a direct current power supply source 41 interconnected with at least one control and measuring system 42.

In the design of the device 1, shown in FIGS. 1 and 2, the reaction chamber 3 for cations 14 is designed to be wider than the reaction chamber 4 for the anions 15. This feature is specifically provided because the cations, especially hydrogen ions (or specifically hydronium ions), migrating through such reaction chamber 3 have a higher mobility. Hence, the cations are in a position to flow through a longer distance of chamber 3 within almost the same time as the anions, especially the hydroxyl ions, passing through the reaction chamber 4. The ion streams, which are the cation stream 14 produced at the anode 33 (i.e., the hydrogen ions) and the anion stream 15 produced at the cathode (i.e., the hydroxyl ions), migrate through reaction chambers 3, 4 and across the flow direction of the liquid being treated (e.g., an aqueous solution), and by so doing displace the ions carried in this liquid (i.e., the ionic salt components) into brine chamber 30 from which these ions in turn are then discharged as a brine (flushing solution).

Figure 3:
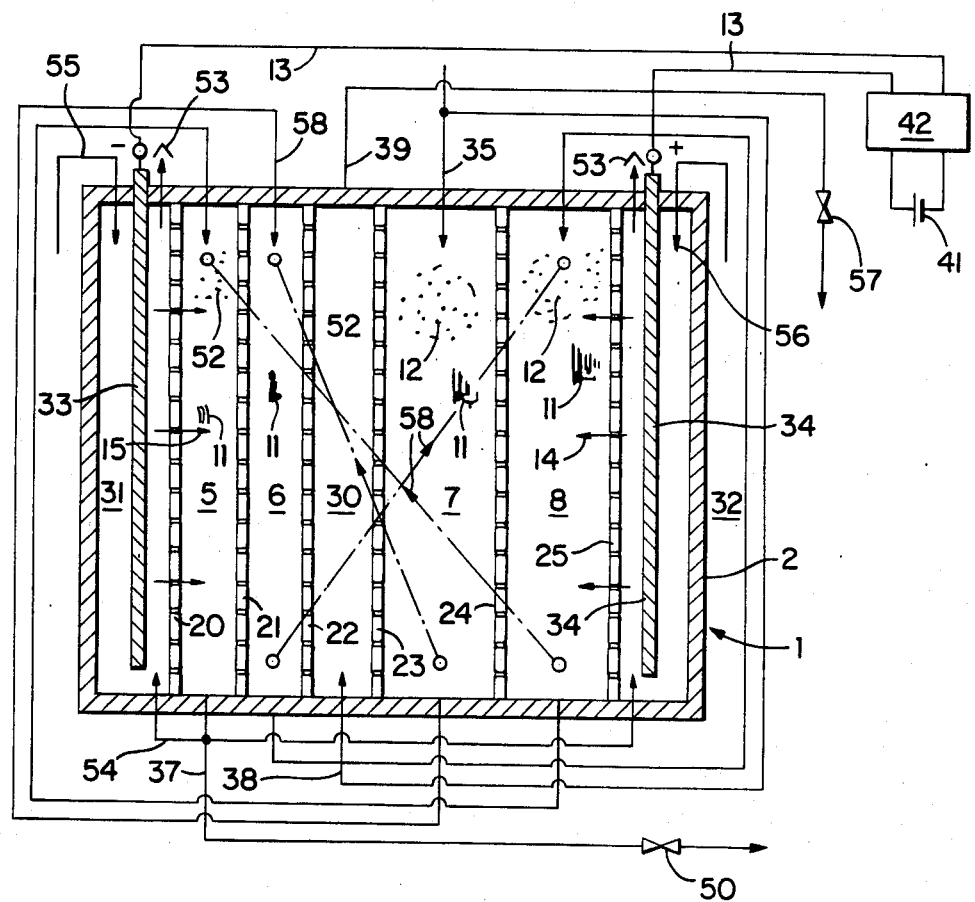
FIG. 3 shows a longitudinal mid-section through a device with four reaction chambers arranged in one vessel. These reaction chambers are longitudinally separated in the direction of flow of the liquid being treated.
Figure 4:
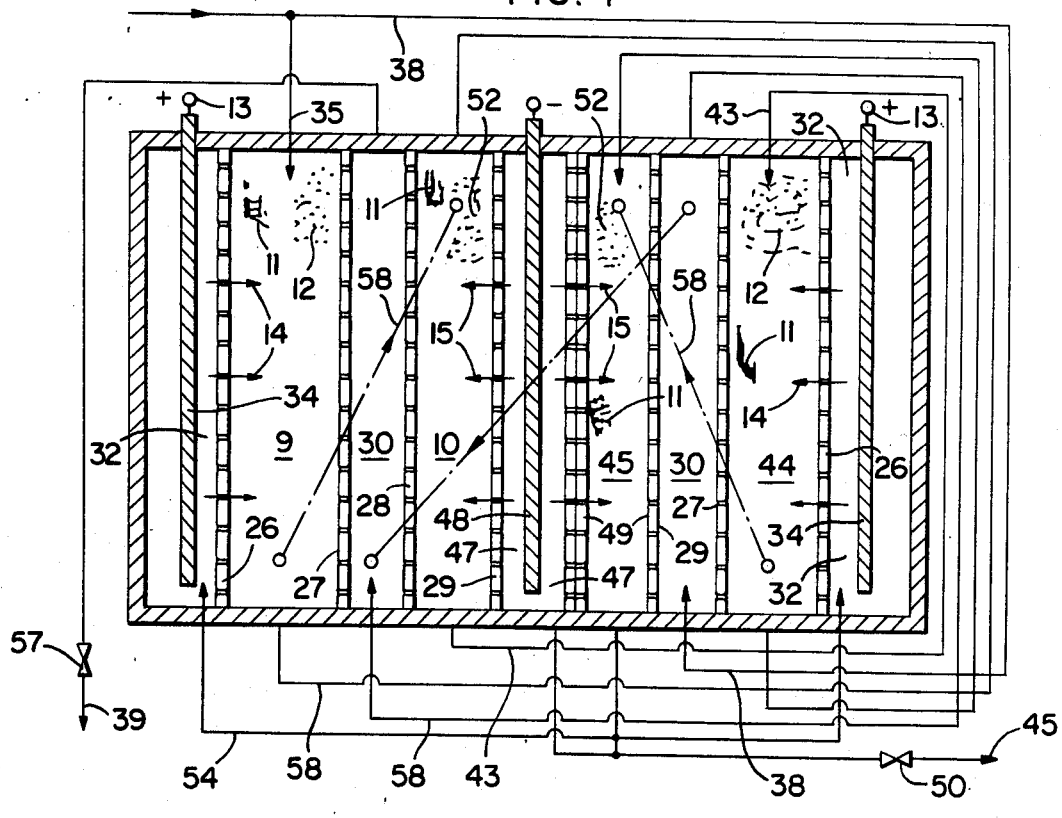
FIG. 4 shows a longitudinal mid-section through two devices connected in series in double train, whereby reaction chambers of the same kind are connected with each other by means of a joint ion-permeable electrode chamber.

The examples of the invention according to FIG. 3 and 4 correspond in principle to the design examples described above, but differ therefrom in that, on one hand, the reaction chambers 5 to 8 are divided longitudinally in the flow direction of the liquid 11 being treated (cf. FIG. 3), and on the other hand, in that several devices 1 (e.g., two such devices) are arranged in a so-called double train (FIG. 4).

In accordance with FIG. 3, e.g., the liquid 11 (or the solution being treated), is passed through the supply pipe 35 into the reaction chamber 7 containing the cation-exchange mass 12 from top to bottom. From there the liquid is conducted by a pipe 58 through an inlet to the reaction chamber 6 containing the anion-exchange mass 52. Then, the liquid is additionally passed through the reaction chamber 8 containing the cation-exchange mass 12, then additionally through the reaction chamber 5 containing the anion-exchange mass 52, etc. After having passed through these reaction chambers, the liquid exits the device 1 through the product pipe 37 as a treated liquid, i.e., a product.

Countercurrent thereto, a separate part of the raw water, i.e. the liquid 11 to be treated, is introduced through the pipe 38 into the bottom of the brine chamber 30, flows through this chamber from bottom to top and exits from the top of this chamber through the brine discharge pipe 39. A stream of hydrogen ions 14 moves from the anode 34 in the electrode chamber 32 across the direction of the flow of the liquid 11 (liquid being treated) through the cation-permeable ion exchange membranes 25, 24 and 23 into the brine chamber 30. Simultaneously, and in the same proportion, starting from the cathode 33 in the cathode chamber 31, a stream of hydroxyl ions 15 moves from the other side across the direction of the flow of liquid 11 being treated through the anion-permeable ion-exchange membranes 20, 21 and 22 and through the anion-exchange mass 52 into the same brine chamber 30.

According to the design of the device corresponding to FIG. 4, starting from the anode 34 in the anode chamber 32, a stream of hydrogen ions 14 moves across the direction of the flow of liquid 11 being treated, through the cation-permeable ion-exchange membranes 26, 27 and through the cation-exchange mass 12 into the brine chamber 30. Simultaneously and in the same proportion, a stream of hydroxyl ions 15 moves from the other side, starting from the cathode 48 and the cathode chamber 47, across the direction of the flow of the same liquid 11 through the anion-permeable ion-exchange membranes 29, 28 and through the anion-exchange mass 52, also into the same brine chamber 30.

According to FIG. 4, a second device is connected to the first device 1, the discharging stream of liquid 11 exiting the reaction chamber 10 for anions 15 is directed overhead by means of a pipe 43 into a reaction chamber 44 for cations 14 connected thereto. The stream of liquid is then passed through such chamber 44 from top to bottom and is then directed overhead into the reaction chamber 45 for anions 15. The liquid 11 flows through this reaction chamber 45 for anions 15 from top to bottom and then exits chamber 45 as the so-called treated liquid, (i.e., a product liquid), through a discharge pipe 46 at the bottom end of this reaction chamber. At variance from the design of FIG. 1 described above, the reaction chambers 10, 45 for the anions 15 are connected on both sides to the electrode chamber 47 in order to obviate the use of a second electrode chamber 47 containing the electrode 48.

According to the process of the invention, the treatment or demineralization of the liquid 11 (or the raw water) takes place in several partial steps. In the anode chambers of all designs of the device there is diluted sulfuric acid which in a well-known manner, as a non-consuming medium, allows the formation of hydrogen ions at the anodes of all designs. A direct-current voltage applied at the electrodes 34, 48, and 38, 34, and in accordance with the resistance of the total system, i.e., the device, an electric current flows as measured by the ampere meter (ammeter) of the control and measuring circuit 42. Equivalent to these electric currents, the hydrogen ion stream 14 moves, as already described, in the direction of the brine chamber 30. In so doing, the hydrogen ion stream crosses the cation stream 14 of the liquid 11, for example, its metal ions, which move from top to bottom through the cation-exchange mass 12.

With this process, a known equilibrium appears between the concentrations of the ions in the aqueous phase on one hand and, on the other hand, in the exchange phase. The stream of liquid acting vertically and the electric field acting horizontally are the driving forces for the motion of the ions 14, 15. However, since the ion-exchange masses 12, 52 have an ion concentration many times higher than the solution surrounding them, the transport processes take place almost exclusively in the exchange phase. This has the definite advantage that a much lower resistance must be overcome for the ionic transfer, and a correspondingly lower amount of energy is necessary than for a pure aqueous solution. This is especially effective in the range of low ion concentrations in water, i.e., when the water is almost totally demineralized.

As the hydrogen ions 14 are constantly supplied with a uniform distribution throughout the entire length of the anode, the ion concentration of the liquid 11 being treated (e.g., the concentration of metal ions) decreases from top to bottom. In accordance with the laws governing the distribution of the ions 14, 15 between the various phases having different selectivities, velocities of displacement of the equilibria acceptable in practice can be achieved only with an excess of one component. In order to shift the equilibria quickly in the direction of low ion concentrations while utilizing the excess component, i.e., the quantity of hydrogen ions 14 (which is tantamount to the utilization of the electric current), the liquid 11 (or an aqueous solution being treated) is first directed to the high ion concentrations near the brine, i.e., through the cation-exchange mass in chamber 7, and only when the ion concentration in the liquid (i.e., metal ions) has decreased is it fed to the region of high hydrogen ion concentration 14, i.e., through the cation-exchange mass of the other reaction chamber 8 (see FIG. 3). But it only flows through this cation-exchange mass 12 after having passed the anion-exchange mass 52 in the anion reaction chamber, i.e., having released anions and thus having become neutral again (cf., FIG. 3). As already known, this means an additional shift in selectivity in the desired direction.

The mechanism of the anion motions inside the anion-exchange masses 52 of the reaction chambers 5, 6 is analogous. In order to promote the formation of hydroxyl ions, the electrode chambers 31 for the cathodes 33 are filled with dilute caustic soda. Since the mobility of the hydrogen ions 14 is greater than that of the hydroxyl ions 15, their concentration, and with it the desired effect on the equilibrium shift, is less pronounced. This feature is compensated, in accordance to the invention, by a longer residence time, i.e., reaction chambers 3, 7, 8 are wider in comparison to reaction chambers 4, 5, 6 containing the anion-exchange masses 52 (cf., FIG. 1), After having left the anion-exchange mass 52, the solution to be further demineralized (cf., FIG. 4) flows through the cation-exchange mass 12 in the reaction chamber 44 and the anion-exchange mass 52 in the reaction chamber 45 and is crossed by the two ion streams 14, 15. According to the invention, the partition of the total ion stream into two or more steps affords the advantage that the electric voltage, and with this the energy consumed for moving the partial ion streams, is lower. It can further be added that, on account of the lower ion concentration in the liquid being treated, the ionic current 14, 15 can also be lower upon the entry into each subsequent stage. This, in turn, means a lower equilibrium concentration of the ions in the solution, i.e., a better product quality of the liquid being treated.

The blocking effect of the ion-exchange membranes is not complete. In practice, the permeability for counter ions, i.e., ions of opposite charge, is up to approximately 2% of the ion concentration being blocked. This would lead to a drop in quality within the last exchange mass. According to the invention, therefore, the last ion-exchange mass to be traversed is bounded by thicker or double membranes 49 as is shown in FIG. 4.

If in the second stage the ion stream 14, 15 (i.e., also the electric current to the electrodes 34, 48) is switched off, the transfer of counter ions into the final product (i.e., into the treated liquid 11) is completely stopped. In this manner, partial quantities of a product of optimum quality may be removed.

It has herein been shown that in a parallel connected twin design according to FIG. 4 in the second and last stage, two partial streams with different qualities can be produced from a single stream of untreated water (i.e., liquid 11), namely by establishing different strength ion streams 14, 15 between the two parallel devices at the end stage of such a multiple train of devices.

The ion streams 14, 15 released from the electrodes 33, 34, 48 consume water for their generation, which can be supplied through the pipe 54 connected to the product pipe 37. The losses of metal ions (e.g., sodium) in the cathode chambers 32 are refilled through the pipe 55. The losses in anions (e.g., sulfate ions) in the anode chambers 31 are refilled through the pipe 56 (FIG. 1). This may be done with dilute sulfuric acid.

Tests have further shown that the electric resistance of device 1 (the entire system), and thus the consumption of energy, is lower if the liquid (i.e., brine) flowing through the brine chamber 30 is intermittently discharged via a discharge valve 57 for the brine.

The ion streams 14, 15 moving towards the brine chamber 30 may cause different regions of the liquid 11 to be heated differently. This also occurs with the brine and the ion-exchange masses 12, 52 as well as with the ion-exchange membranes 16 to 19 and 49. As a result of this, zones of different electric resistance are created in the device 1 causing a disturbance of the uniform distribution of ion streams 14, 15. It has now been experimentally determined that by temporarily interrupting the energy supply and a simultaneously short interruption of the product stream, i.e., the discharge liquid 11 from the product pipes 37 (FIG. 2) and 46 (FIG. 4), these inhomogeneities can be completely eliminated by means of a product valve 50.

In order to avoid superheating the reaction chambers 3, 4, 5 to 8, 9, 10, 44, 45 and/or the brine chamber 30, the liquid stream (raw water) is interrupted and a temperature switch 51 (FIG. 1) is provided inside vessel 2 which interrupts the electric current in the power supply 41 when critical temperatures are reached.

During the production of the above ion streams 14, 15 at the electrodes 33, 34, and 48, oxygen is produced at the anode and hydrogen is produced at the cathode. These gases are discharged from the device 1 by a deaerator 53 (FIGS. 1 and 3).

Calculations have shown that the economy of the process can be increased, particularly in the case of high salt contents of the solution being demineralized (the liquid 11 being treated) by transforming the energy content of the gases formed with suitable devices (for example, heat engines, fuel cells, and the like) into electric energy. This energy is then re-supplied to the electrodes 33, 34, 38.

Figure 5:
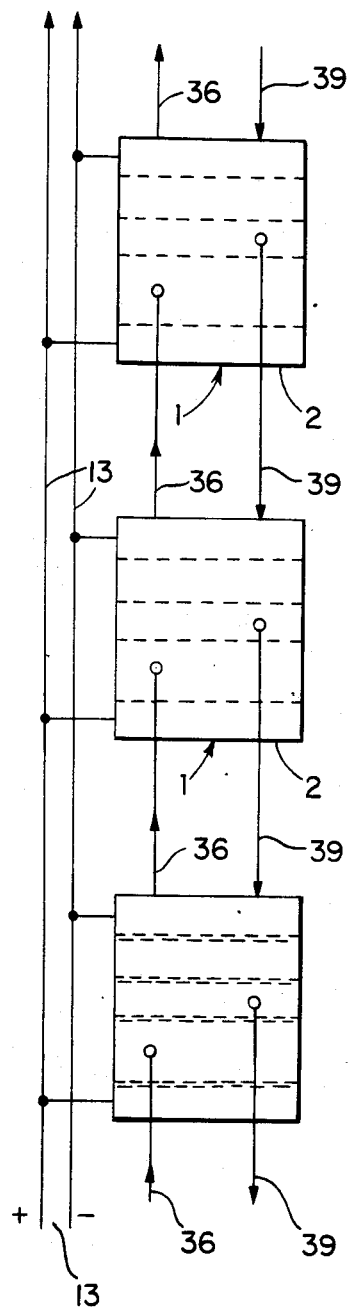
FIG. 5 shows a top view of some devices connected in series in multiple train with the piping system supplying them with energy and liquid.

A multiple train of devices 1 connected in series according to the invention is illustrated in FIG. 5. These devices 1 are connected in parallel to a common electric power supply 41 and in series with regard to the liquid 11 being treated. For clarity's sake this multiple train of devices 1 is shown in the drawing in a smaller scale.

According to the design example of FIGS. 6 and 7, the device of the invention is essentially formed by a number of heat-exchange chambers 57, 58, 59 through which an aqueous solution being demineralized is directed. The solution passes these heat exchange chambers 57, 58, 59 one after the other and then flows into the demineralization chambers 60, 61. After being enriched with salt during the process of demineralization, the solution is discharged from a brine chamber 62 through a pipe 63. The brine is then directed through the heat exchange chamber 57 counter-current to the aqueous solution being demineralized, the latter being supplied through a pipe 64 to the heat exchange chambers 57, 58, 59 and discharged through a pipe 65.

The brine solution transfers its capacitive heat to the solution being demineralized supplied to this heat exchange chamber 57 through the pipe 10, thus increasing the temperature of the solution being demineralized. The demineralized aqueous solution being discharged through pipe 65 from the demineralization chamber 61, is then directed counter-current to the pre-heated aqueous solution being demineralized which passed through the heat exchange chamber 57 and was supplied through the pipe 10 to this chamber 58 where it then transfers its capacitative heat to the solution being demineralized in the heat exchange chambers 58.

The temperature of this aqueous solution being demineralized is further increased in the heat-exchange chamber 58. A heating medium extraneous to the system is supplied into the heat-exchange chamber 59 through a pipe 67 and counter-current to the already pre-heated aqueous solution being demineralized. This heated medium is supplied to the chambers 57 and 58 by the pipe 64 and increases the temperature of the aforesaid solution being demineralized up to a desired higher temperature. Then the heated aqueous solution being demineralized is directed to the supply pipe 65 into the demineralization chambers 60, 61, and is thus being returned to the demineralization process.

The salts withdrawn during the process from the aqueous solution being demineralized are transported by anions and cations produced in electrode chambers 68, 69 into the brine chamber 62 from where they are eliminated through the pipe 63. Heat insulation 70 can fully cover the demineralization and brine chambers 60, 61, 62, as well as the entire device 1 used in the demineralization process.

The heat-exchange chambers 57, 58, 59 are equipped with heat-exchange elements. These elements provide good heat transfer from the discharged brine to the aqueous solution being demineralized and from the demineralized aqueous solution provided through pipe 65 to the aqueous solution being demineralized. In order to discharge the heating solutions (i.e., the brine), the demineralized aqueous solution supplied to the exchange chambers 58 and the extraneous heating solution from the heating chambers, the said chambers 57, 58, 59 are equipped with discharge pipes 71, 72 and 73.

The pipe 72 leads into a product collecting space, the pipe 71 leads into a brine storage space, and the pipe 72 leads into the open air or into a recovery space.

Raw water is supplied to the brine chamber 62 by a tap line 74. This tap line is connected to the supply pipe 65 which joins the heat exchange chambers 71, 72, 73 with the demineralization chambers 60, 61. The demineralization chambers 60 and 61, as well as the brine chamber 62, correspond to the aforementioned design according to the present invention, and as designated they are separated from each other by ion-exchange membranes 75, 76, 77, 78. The electrode chambers 68, 69 correspond to such chambers previously described according to the present invention, and they need not be further described here.

Figure 8:
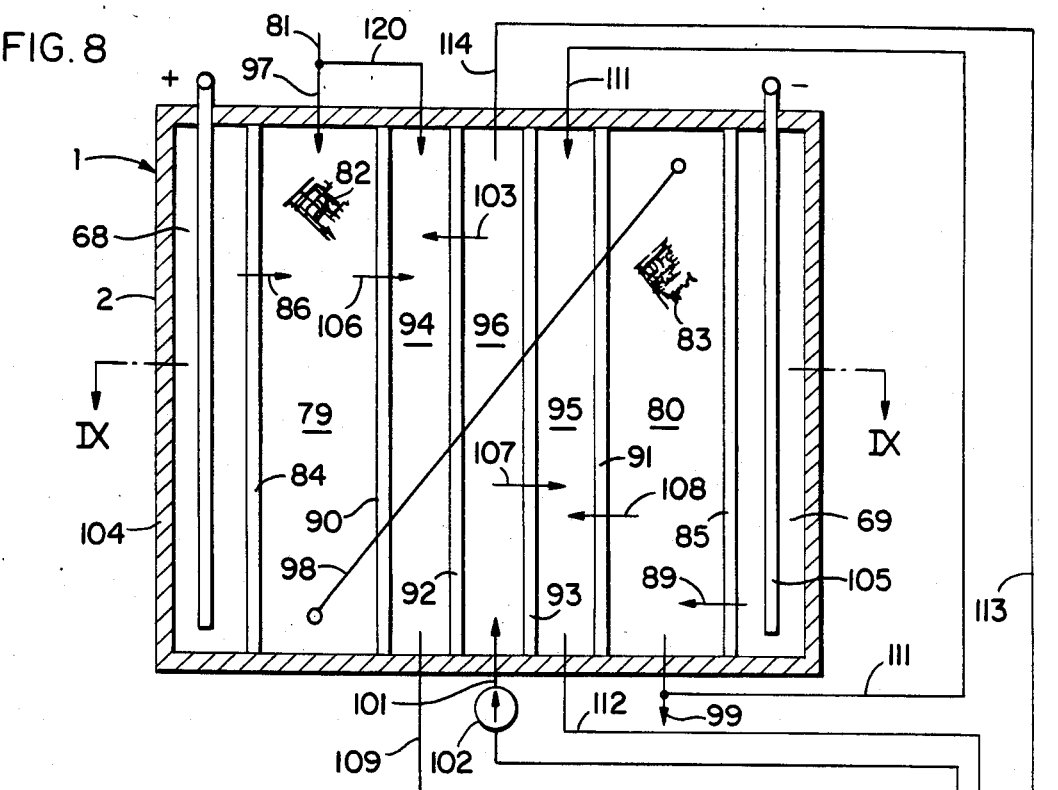
FIG. 8 shows a longitudinal mid-section through a plane VIII—VIII of FIG. 9 of a device according to that form of the invention in which two reaction chambers, two brine chambers, one salt chamber therebetween are arranged in one vessel, and a mixing vessel is arranged separately from this vessel.
Figure 9:
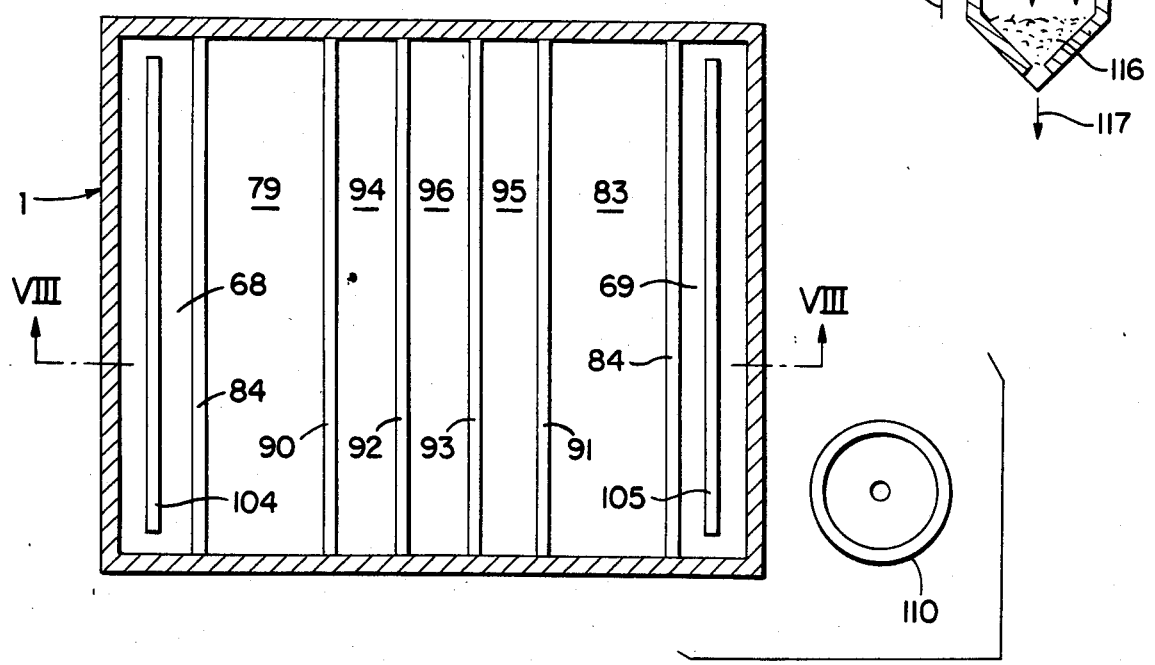
FIG. 9 shows a cross-section through the plane IX—IX in FIG. 8 of the device and a top view of the mixing vessel.

In an analogous manner to the aforementioned designs, and according to the invention presented in FIG. 8, the device 1 is essentially constituted by a vessel 2 for the reaction chambers 79, 80 where the absorption processes take place between a liquid 81 being treated, ion-exchange masses 82 and 83 and the electrode chambers 68 and 69. The reaction chambers 79 and 80 are each filled with ion-exchange masses 82, 83 through which flows the liquid 81 being treated.

The reaction chambers 79, 80 are bounded at both sides by boundary layers in the form of ion-exchange membranes 84, 85. These membranes are provided for cations 86 (e.g., hydrogen ions) and anions 89 (e.g., hydroxyl ions), the ion-exchange membrane 84 being cation-permeable and the ion-exchange membrane 85 being anion-permeable. The anode chamber 68 is bounded on one side by the reaction chamber 79 and the cathode chamber 69 is bounded on one side by the reaction chamber 80. The reaction chamber 79 is bounded on the other side by cation-permeable ion-exchange membrane 90 and the reaction chamber 80 is bounded on the other side by ion-exchange membrane 91. Being constructed with the two ion-exchange membranes 90 and 91 as boundary layers, the space between the reaction chambers 79 and 80 is divided into three chambers by an anion-permeable ion-exchange membrane 92 and a cation-permeable ion-exchange membrane 93, whereby a brine chamber 94 appears on the cation side, a brine chamber 95 on the anion side and therebetween remains a brine chamber 96.

The liquid 81 being treated flows through a supply pipe 97 into the reaction chamber 79 and flows therethrough and is then transported into the reaction chamber 80 through a connecting pipe 98. The liquid then flows through reaction chamber 80 and leaves the demineralization device through the discharge pipe 99 as a demineralized liquid. A readily soluble saline solution 100 is supplied to the brine chamber 96 through a supply pipe 101 by means of pump 102. The saline solution flows through the chamber 96, and thereby the solution's dissociated anions 103 migrate in the electric field created between anode 104 and cathode 105 through the anion-permeable membrane 92 into the brine chamber 94, and its dissociated cations 107 migrate through the cation-permeable membrane 93 into the brine chamber 95. In the brine chamber 94 the anions 103 meet the cations 106 displaced from the reaction chamber 79 and form readily soluble compounds. In the brine chamber 95 the cations 107 meet the anions 108 displaced from the reaction chamber 80 and form readily soluble compounds as well. Through the supply pipe 120, a partial stream of the liquid 81 is directed into the brine chamber 94 and the enriched brine is thereby flushed from the brine chamber 94 through the discharge pipe 109 and directed into the mixing vessel 110. A partial stream of the product (i.e., the demineralized solution) flowing through the discharge pipe 99 is directed through the supply pipe 111 into the brine chamber 95 and the thus enriched brine is then flushed from the brine chamber 95 through the discharge pipe 112 and introduced into the mixing vessel. The diluted saline brine 100 is discharged from the brine chamber 96 through a discharge pipe 114 connected via a recycling pipe 113 to the mixing vessel 110.

A supply pipe 115 leads into the mixing vessel 110 for the charging of fresh saline brine to compensate for any possible losses. When mixing the two brines from the brine chambers 94, 95, a precipitate 116 is formed of the sparingly soluble salt components (e.g., calcium carbonate, calcium sulfate, and the like), which are discharged through the discharge pipe 117.

While the foregoing is illustrative of the preferred embodiments of my invention, it will be understood by those skilled in the art that modifications and changes can be made without departing from the spirit of the invention. Hence, it is intended that the invention be limited only by the scope of the claims and their equivalents.

I claim:

1. A process for demineralizing an aqueous liquid containing salts, comprising:
   (a) passing the liquid through at least a first means for exchanging cations, a means for exchanging anions, and a second means for exchanging cations; the cation-exchange means containing hydrogen ions and the anion-exchange means containing hydroxyl ions, whereby cations and anions dissociated from the salts are exchanged for the hydrogen ions and the hydroxyl ions, thereby reducing the concentration of salts in the outflowing liquid;
   (b) applying electric potential across the direction of flow of the liquid whereby hydrogen ions and hydroxyl ions migrating in opposite directions are exchanged for the cations and anions in the means for exchanging ions thereby restoring said hydrogen and hydroxyl ions to the means, and whereby the displaced cations and anions are caused to migrate in opposite directions; and
   (c) passing a flushing solution across the direction of the ion migration capable of receiving the cations migrating out from said first means for exchanging cations and the anions migrating out from the means for exchanging anions, whereby salts are formed and discharged with the flushing solution.

2. The process of claim 1 wherein the liquid to be demineralized is raw water.

3. The process of claim 1 wherein the liquid to be demineralized is pre-softened.

4. The process of claim 1 wherein
   the first and second means for exchanging cations are cation-exchange resins; and
   the means for exchanging anions is an anion-exchange resin.

5. The process of claim 1 wherein the flushing solution is a salt solution.

6. The process of claim 3 wherein the liquid in step (a) is passed through a second means for exchanging anions.

7. The process of claim 3 wherein the liquid in step (a) is alternately and sequentially passed through two cation exchange means and two anion exchange means.

8. The process of claim 1 wherein the electric potential in step (b) generates a stream of cations which travels from an anode towards a cathode through the liquid and the flushing solution during the residence thereof in the following sequence: (I) liquid in said second means for exchange of cations, (II) liquid in said first means for exchange of cations, (III) said flushing solution, and (IV) liquid in said first means for exchange of anions; and a stream of anions which travels from the cathode towards the anode through the liquid and the flushing solution in a sequence opposite to the current of cations.

9. The process of claim 3 wherein steps (a) through (c) are conducted simultaneously.

10. A continuous process for demineralizing an aqueous liquid comprising conducting steps (a) through (c) of the process of claim 3 in a continuous manner.

11. The process of claim 1 wherein said migrating cations and anions access said flushing solution approximately simultaneously.

12. The process of claim 8 wherein
the cations are substantially prevented from migrating out of the means for exchanging anions into a liquid surrounding the cathode by a means for selectively permeating only anions; and
the anions are substantially prevented from migrating out of the means for exchanging cations into a liquid surrounding the anode by a means for selectively permeating only cations.

13. The process of claim 1 wherein
the liquid to be demineralized is heated in order to increase its temperature during demineralization.

14. The process of claim 12, wherein
the means for selectively permeating anions is an anion-permeable membrane; and
the means for selectively permeating cations is a cation-permeable membrane.

15. The process of claim 12 wherein at least one of said means for selectively permeating ions is a double ion permeable membrane substantially impermeable to counter-ions.

16. An apparatus for demineralizing an aqueous liquid containing salts, comprising:
at least one anode,
at least one cathode,
at least one means for exchanging cations,
at least one means for exchanging anions,
at least one flushing means,
said means for exchanging ions and said flushing means being separated from each other by means for selectively permeating ions;
means creating an electric potential between said anode and said cathode whereby the means for exchanging ions are regenerated by hydrogen and hydroxyl ions migrating in opposite directions from said electrodes; and
means for causing said cations and anions migrating toward said flushing means to enter said flushing means at substantially the same rate.

17. An apparatus for demineralizing a pre-softened aqueous liquid containing salts, which comprises:
a cathode;
an anode;
a flushing means;
a means for exchanging anions; and
a first and a second means for exchanging cations, said first means for exchanging cations positioned between said flushing means and said second means for exchanging cations;
and further comprising, means for passing the liquid sequentially through the first means for exchanging cations, the means for exchanging anions, and therefrom through the second means for exchanging cations before exiting the apparatus.

18. The apparatus of claim 17 wherein
the means for exchanging cations is a cation exchange resin, and
the means for exchanging anions is an anion exchange resin.

19. The apparatus of claim 17 wherein the flushing means is a dilute salt solution.

20. The apparatus of claim 17 wherein the apparatus is insulated to retain heat within said apparatus.

21. The apparatus of claim 17 wherein
said means for selectively permeating cations is a cation-permeable membrane which is substantially impermeable to anions, the liquid and a flusing solution; and
said means for selectively permeating anions is an anion-permeable membrane which is substantially impermeable to cations, the liquid and the flushing solution.

22. The apparatus of claim 17, containing
two anodes,
one cathode,
two means for exchanging cations, and
two means for exchanging anions, wherein
said first means for exchanging cations is positioned between the first anode and a first flushing means;
said first means for exchanging anions is positioned between the first flushing means and the cathode;
said second means for exchanging cations is positioned between a second flushing means and the second anode; and
said second means for exchanging anions is positioned between the cathode and the second flushing means;
said apparatus further comprising means for transferring the liquid from the first means for exchanging of cations to the first means for exchanging anions, therefrom to the second means for exchanging cations before exiting the apparatus.

23. The apparatus of claim 17, further comprising at least one heat exchange means for transfer of heat from solutions exiting said apparatus to said aqueous liquid to be demineralized prior to passing into the first means for exchanging cations.

24. A multi-compartmented apparatus for demineralizing an aqueous liquid containing salts, which comprises in combination:
(a) a cathode chamber containing a cathode;
(b) an anode chamber containing an anode;
(c) a flushing chamber positioned between said anode chamber and said cathode chamber;
(d) a first ion exchange chamber containing cation exchange resins on one side of said flushing chamber and separated from said flushing chamber by a cation permeable membrane;
(e) a second ion exchange chamber containing anion exchange resins on the other side of said flushing chamber and separated from said flushing chamber by an anion permeable membrane;

(f) a third ion exchange chamber containing cation exchange resins positioned between said first anion exchange chamber and said anode chamber and separated from each by a cation permeable membrane;

(g) means to impress a direct electric current across said cathode and said anode to create an electric potential in said first ion exchange chamber, said second ion exchange chamber, said third ion exchange chamber, and said flushing chamber;

(h) means to pass the liquid to be treated sequentially through said first ion exchange chamber, said second ion exchange chamber, and said third ion exchange chamber; and (i) means for passing a flushing solution through said flushing chamber.

25. The multi-compartmented apparatus of claim 24 wherein the first ion exchange chamber, the second ion exchange chamber, and the third ion exchange chamber are sized so as to cause cations and anions to enter said flushing chamber at substantially the same rate.

26. The multi-compartmented apparatus of claim 24 and further including heat means to increase the temperature of the liquid to be treated.

27. The multi-compartmented apparatus of claim 24 wherein the outside of said apparatus is insulated in order to retain latent heat therein.

28. The multi-compartmented apparatus of claim 24 and further including means for automatically controlling the flow of the flushing solution passing through the flushing chamber.

29. The multi-compartmented apparatus of claim 24 wherein the aqueous liquid containing salt has been pre-softened.

30. A method of simultaneously decreasing the salt content of a first solution and increasing the salt content of a second solution which comprises:

(a) passing the first solution sequentially through at least a first means for exchanging cations, a first means for exchanging anions, and a second means for exchanging cations; the cation exchange means containing hydrogen ions and the anion exchange means containing hydroxyl ions, whereby cations and anions disassociated from the salt content of said first solution are exchanged for the hydrogen ions and the hydroxyl ions, thereby reducing the salt content in the first solution;

(b) establishing an electric potential across the ion exchange means in order to migrate hydrogen ions and hydoxyl ions in opposite directions for exchange with the cations and anions in the means for exchanging ions thereby restoring said hydrogen and hydroxyl ions to the means, and in order to migrated displaced cations and anions in opposite directions; and (c) passing said second solution across the direction of the ion migration in order to receive the cations migrating out from said first means for exchanging cations and the anions migrating out of the means for exchanging anions, whereby the salt content of said second solution is increased.

31. The method of claim 30 wherein said first solution is pre-softened water.

32. The multi-compartmented apparatus of claim 24 and further including means for recombining oxygen and hydrogen gases generated at the anode and cathode.

33. The apparatus of claim 32 wherein the means for combining the oxygen and hydrogen gases forms water for reuse in said apparatus.

34. A multi-compartmented apparatus for demineralizing a pre-softened aqueous liquid containing salts including chlorine ions, which comprises:

a cathode;

an anode;

a flushing chamber positioned between said anode and said cathode;

a first ion exchange chamber containing cation exchange resins on one side of said flushing chamber and a second ion exchange chamber containing anion exchange resins on the other side of said flushing chamber;

a third ion exchange chamber containing cation exchange resins positioned between said anion exchange chamber and said anode; and means to impress a direct electric current across said cathode and said anode to create an electric potential in said first, second, and third ion exchange chambers and said flushing chamber, the position of said third ion exchange chamber between said second ion exchange chamber and said anode insulating against the migration of chloride ions to said anode to prevent chlorine formation.

35. A process for demineralizing an aqueous liquid containing salts, comprising:

(a) sequentially passing the liquid through means for exchanging cations containing hydrogen ions and means for exchanging anions containing hydroxyl ions whereby cations and anions disassociated from the salts are exchanged for the hydrogen ions and the hydroxyl ions thereby reducing the concentration of salts in the outflowing liquid;

(b) applying electric potential across the direction of flow of the liquid whereby hydrogen ions and hydroxyl ions migrating in opposite directions are exchanged for the cations and anions in the ion exchanging means thereby restoring said hydrogen and hydroxyl ions to the means, and causing the displaced cations and anions to migrate in opposite directions; and (c) passing a series of flushing solutions across the direction of the ion migration, one solution capable of receiving the cations migrating out from said means for exchanging cations and another solution capable of receiving the anions migrating out from the means for exchanging anions whereby salts are formed and discharged with the flushing solutions.

36. The process of claim 35 in which the first two flushing solutions are mixed to form a third flushing solution which passes across the direction of the ion migration between the first and second flushing solutions.

37. The process of claim 35 wherein the liquid to be demineralized is raw water.

38. An apparatus for demineralizing an aqueous liquid containing salts, which comprises:

a cathode and an anode, means for exchanging cations and means for exchanging anions, means for passing the liquid sequentially through the means for exchanging cations and the means for exchanging anions before exiting the apparatus; and flushing means including a first flushing solution to receive the cations migrating out from said means for exchanging cations, a second flushing solution to receive the anions migrating out from said means for exchanging anions, and a third flushing solution to supply anions and cations, respectively, to said first and second flushing solutions.

39. The apparatus of claim 38 and further including a mixing means for mixing the first and second flushing solutions to form the third flushing solution.

* * * * *